INVENTORS
John R. Speer
George J. Groya
ATTORNEYS

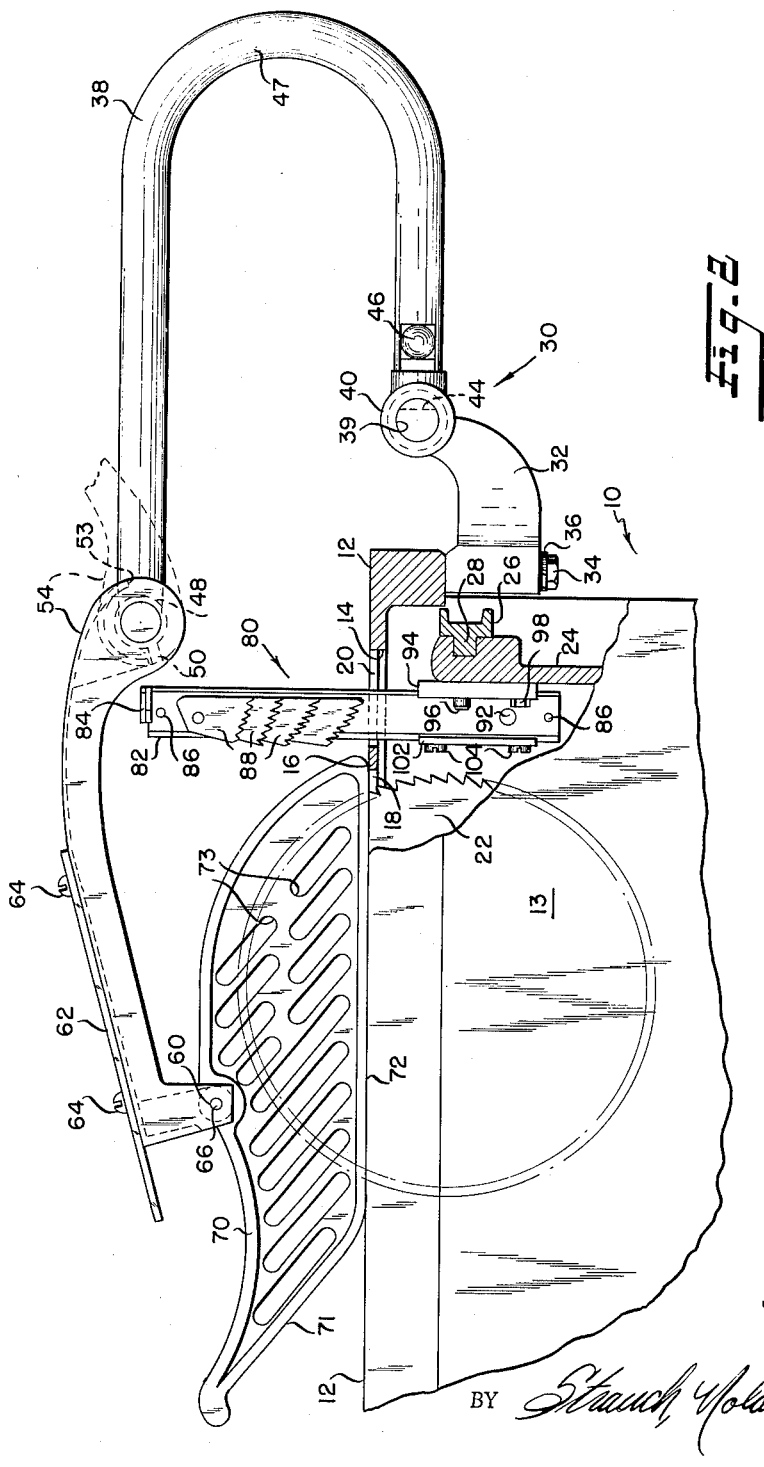

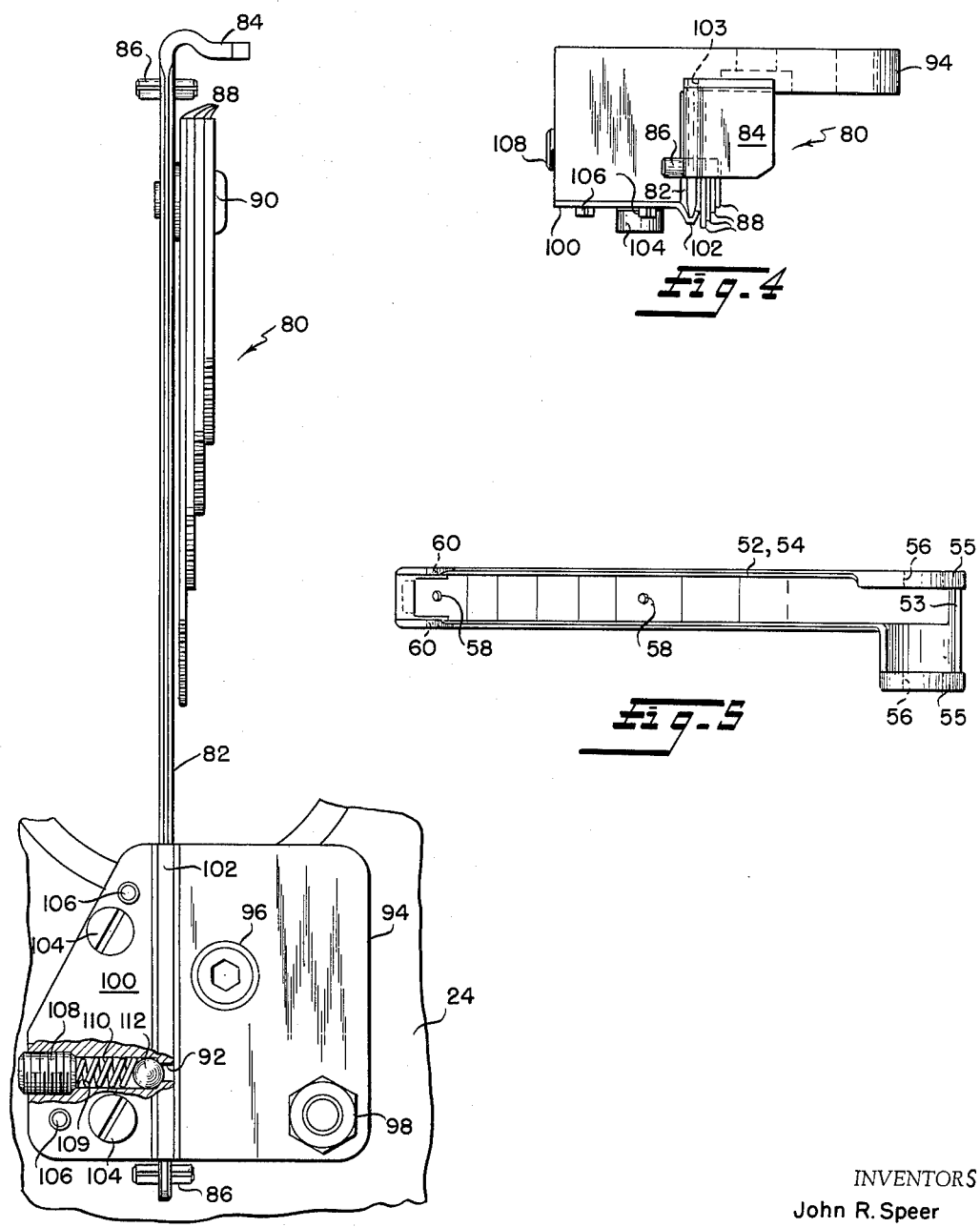

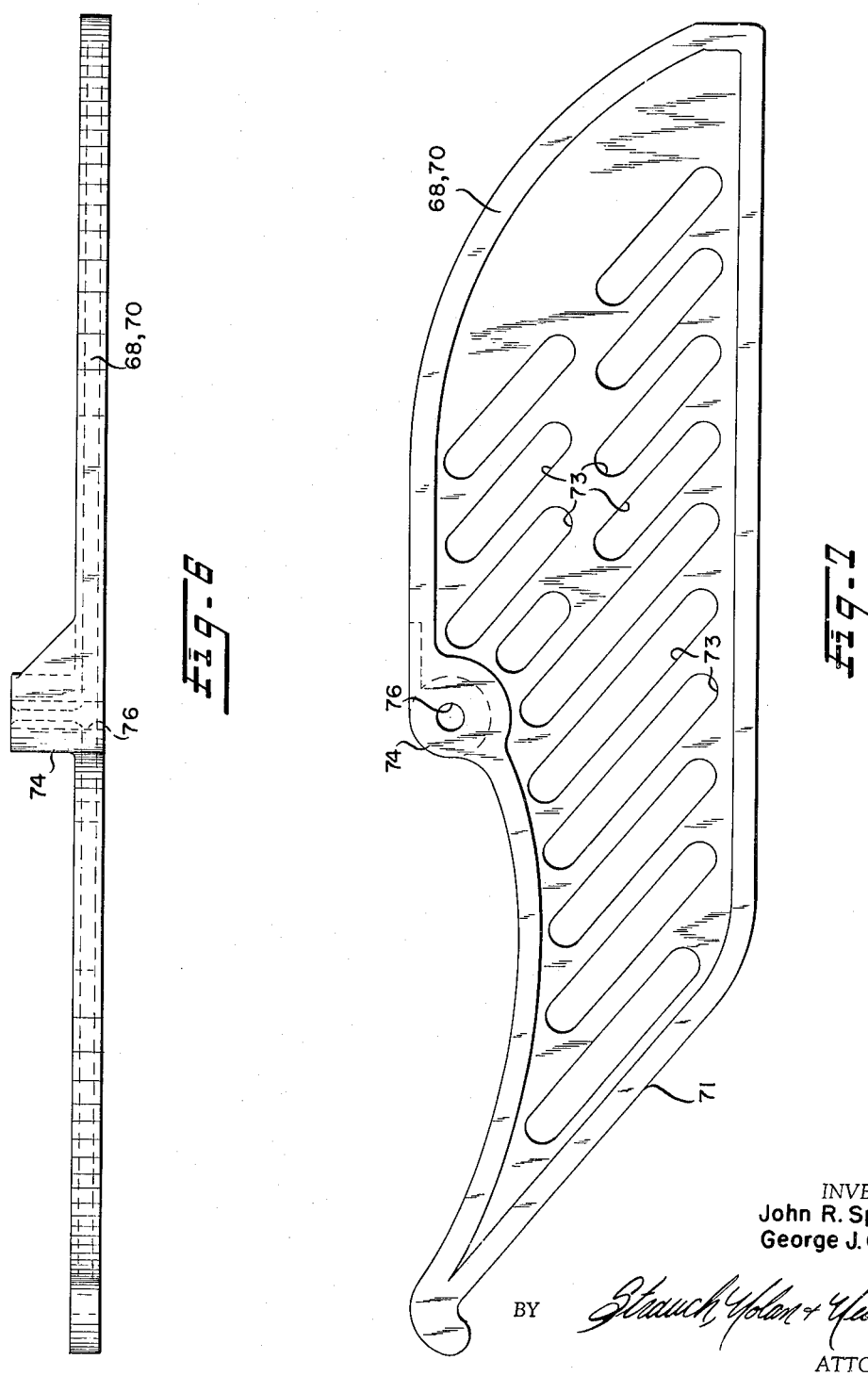

United States Patent Office 3,232,326
Patented Feb. 1, 1966

3,232,326
BLADE GUARD AND SPLITTER ASSEMBLY
FOR TABLE SAWS
John R. Speer, Pittsburgh, Pa., and George J. Groya, Pinneberg, Germany, assignors to Rockwell Manufacturing Company, Pittsburgh, Pa., a corporation of Pennsylvania
Filed Oct. 4, 1962, Ser. No. 228,439
9 Claims. (Cl. 143—159)

This invention relates to power tools generally and specifically to safety equipment for circular table saws. More specifically, the invention relates to cutter blade guard and splitter assemblies for such saws; however, the invention is not limited to such use.

The provision of blade guards for table saws is known as evidenced by United States Letters Patent No. 2,466,325 to Ocenasek disclosing a two part blade guard composed of side plates independently supported for translatory motion from an overhead support and No. 2,007,887 to Tautz disclosing a basket-type guard pivoted from a support at the rear of the work table. Similarly, splitters are known in the prior art as evidenced by United States Letters Patent No. 2,530,867 to Galanga disclosing a splitter rotating from its retracted position below the table to an operative position thereabove.

In the present invention, the support for the cutter blade guard is mounted at a rear corner of the work table out of the working area. The suport is simple but rigid. It supports the guard for lateral shifting as required in various operations on a table saw such as cutting with a molding cutter or a dado head. Further, the guard and splitter are so constructed and related that the splitter may be used in bevel cutting operations on the saw and that the guard alone may be used when the splitter is in a retracted, inoperative position, for example, during a crosscutting operation. The guard consists of two plate-like guard members which, upon contact with the work, are free to ride independently over the work as it is fed across the work table. Further, as required by the exigencies of a particular cutting operation, either guard member may be independently, manually moved to an inoperative position out of the working area to assure versatile guarding of the blade in substantially all cutting operations on the table saw. The guard members are pivotally mounted thus assuring free, easy motion as the work passes across the work table. This invention also provides sufficient separation between the guard members to permit bevel cutting with full guard protection, the cutter blade being free to cut to 45° with both blade guard members in an operative position. This same separation permits the use of the blade guard in a molding or a dado operation.

The splitter of the invention is mounted at the rear of the plate-like guard members so it may tilt relative to them without interference and is arranged to be retracted in the plane of the blade to an inoperative position completely beneath the saw table. The splitter has anti-kickback fingers which operate conventionally to prevent work from being thrown by the saw blade in event the feed pressure is reduced or removed from the work.

A primary object of this invention is to provide an improved, simple, strong, but versatile guard and splitter assembly for use with table saws.

Another object of this invention is to provide an improved guard assembly having a transparent shield to provide visibility of the cutting action and still protect the operator from flying chips.

A still further object of the present invention is to provide an improved guard assembly made up of plate-like side guard members that may be conveniently shifted in a direction transverse to the cutter blade so that the guard assembly can provide full protection under substantially all working operations.

A further object of the present invention is to provide an improved guard assembly in which the opposite sides of the cutter blade are protected by respective plate-like guard mmebers, thus permitting independent movement of the respective guard members over the work as it moves through the table saw and further permitting the operator to independently move a respective guard member to an inoperative position remote from the table working area when that guard member would interfere with the particular cutting operation.

Another object of this invention is to provide an improved guard assembly for table saws which can be used with the cutter blade in a fully tilted position of 45° without changing the effectiveness of the guard assembly.

A further object is to provide in combination with a table saw an improved retractable splitter and guard assembly in which pivotally suspended guard members can be moved between inoperative and operative positions without interference with the splitter when the splitter is in an extended position.

A further object is to provide an improved splitter assembly in which the splitter blade is permanently mounted but is slidably retractable through an opening in the work table to an inoperative position.

A further object is to provide an improved retractable splitter assembly which has a spring-loaded detent to releasably hold the splitter in an extended operative position.

Another object is to provide a retractable splitter assembly with anti-kickback means.

A still further object is to provide an improved splitter assembly which, when employed with a tilting arbor saw, tilts with the cutter blade and yet may be moved to an inoperative position in all tilted operating positions.

Further objects will appear from the following description and the appended claims when read in conjunction with the accompanying drawings wherein:

FIGURE 2 is a side view of the apparatus of FIGURE 1 partially broken away at the rear to illustrate the splitter mount;

FIGURE 3 is a front view of the splitter assembly;

FIGURE 4 is a top plan view of the assembly of FIGURE 3 removed from its mount on the saw;

FIGURE 5 is a bottom plan view of one of the guard arms of FIGURES 1 and 2;

FIGURE 6 is a top plan view of the guard plate members of FIGURES 1 and 2; and

FIGURE 7 is a side view of the guard member of FIGURE 6.

Figure 1:
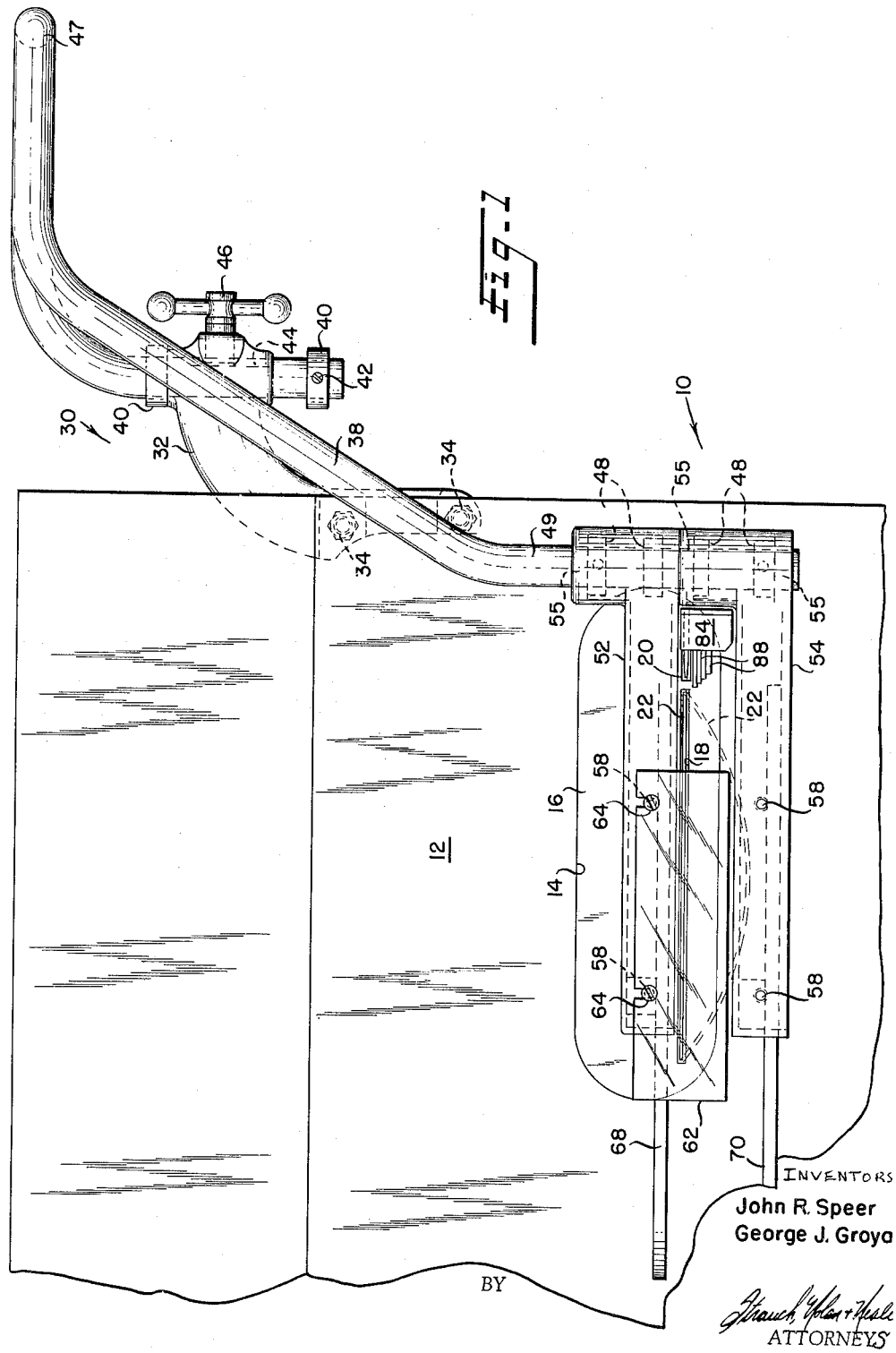
FIGURE 1 is a fragmentary top plan view of a table saw with the guard and splitter assembly of this invention in place.

Referring to the drawings in detail, FIGURES 1 and 2 show a table saw 10 with a work table 12 and a side panel 13 mounted thereon. In the working area of table 12 there is provided a blade opening 14 which is normally closed by an insert plate 16 in conventional manner. Insert plate 16 is provided with a cutter blade slot 18 and a splitter slot 20, the latter being open at its back end. A cutter blade 22 protrudes through the cutter blade slot 18, and rotates on an arbor, not shown.

As described in United States Letters Patent No. 2,265,407, the arbor may be supported for tilting movement between a front trunnion, not shown, and a rear trunnion 24. Rear trunnion 24 arcuately, slidably engages a rear trunnion bracket 26 which is formed with an arcuate rib 28. The center of curvature of rib 28 is a line defined substantially by the intersection of the plane of the cutter blade 22 and the plane of the top surface of the table 12.

The cutter blade guard assembly is indicated generally by the reference numeral 30 and includes a guard support bracket 32 which is attached to table 12 by means of bolts 34 and lock washers 36. A guard support member 38, in the form of a suitably bent cylindrical tube or rod, is rotatably and slidably supported in a through socket passage 39 in bracket 32. Its sliding motion is limited by collars 40 affixed thereto by means of set screws 42. Support member 38 has a flat 44 in the vicinity of bracket 32. A lockbolt 46 threadedly engages bracket 32 and when tightened and clamped upon flat 44 of support member 38 prevents rotation and sliding motion of support member 38 in bracket 32. Support member 38 has a rearwardly extending U-shaped loop 47 and a forwardly disposed end portion 49 extending horizontally and transversely above table 12 in a position to the rear of cutter blade 22. Respective sets of collars 48 are mounted on end portion 49 and are affixed thereto by set screws 50. Guard arms 52 and 54 are pivotally journalled on end portion 49 and are independently restrained from axial movement therealong by means of the respective sets of collars 48.

As seen in FIGURES 1 and 5, guard arms 52 and 54 are formed with spaced ears 55 defining between them a laterally directed stop edge 53 which abuttingly cooperates with the head of set screws 50 to limit the rearward rotation of guard arms 52 or 54 to the dotted line position shown in FIGURE 2. The spaced ears 55 of guard arms 52 and 54 have bores 56 to receive end portion 49 of support member 38. The guard arms 52 and 54 further have bores 60 at the opposite end thereof from the bores 56, and further have tapped holes 58 in their forward upper surfaces for a purpose to be hereinafter explained.

As shown in FIGURES 1 and 2, a plate-like plastic shield 62 is mounted on arm 52 by means of screws 64 threaded into tapped holes 58. Bores 60 in guard arms 52 and 54 carry journal pins 66 which rotatably support respective guard members 68 and 70.

As seen in FIGURES 2, 6, and 7, elongated plate-like members 68 and 70 have a forwardly disposed, inclined, work engaging edge 71 leading into a bottom work engaging edge 72 and are provided with lightening and visibility slots 73. Guard members 68 and 70 each have a transversely disposed boss 74 having a bore 76 therethrough to receive journal pin 66.

As best seen in FIGURES 2, 3, and 4, the splitter assembly 80 includes splitter blade 82 having an end tab section 84 disposed generally at right angles to the main blade body. Roll pins 86 extend through and tightly engage openings in the top and bottom portions of splitter blade 82. Attached to the side of splitter blade 82 by a pivot pin 90 fixed in blade 82 are depending swingable anti-kickback fingers 88. The lower portion of splitter blade 82 has a countersunk through opening 92. A splitter support bracket 94 is attached to the rear trunnion 24 of the table saw by means of screw fasteners 96 and 98. A clamp plate 100 having an axially extending trough 102 receives the forward edge of splitter blade 82 and is fastened to bracket 94 by means of screw fasteners 104 which, when tightened, adjustably clamp the lower end of blade 82 against the bottom wall of an opposing slot 103 in bracket 94. Bracket 94 also carries roll pins 106 which extend through clamp plate 100 to serve as alignment pins. A set screw 108 compresses a spring 110 within a bore 109 in bracket 94. Spring 110 presses against a ball 112 which fits into countersunk opening 92 when splitter blade 82 is extended to its operative position.

In normal operation, the guard assembly 30 is positioned as shown in FIGURES 1 and 2. As the work is fed through the saw, it first engages the inclined forward edges 71 of guard members 68 and 70. The guard members then independently ride up over the work to slidably rest upon the work on bottom edges 72. As the work progresses past the cutter blade 22, the splitter blade 82 enters the kerf and spreads the two parts of the work to prevent binding of the cutter blade 22. If the particular cutting operation is such that only one of the guard members 68 or 70 is aligned to be engaged by the work as it passes through the saw, the unengaged blade guard remains in table abutting contact. Thus, because of the independent action of the guard members 68 and 70, rotary cutter blade 22 is fully guarded from both sides at all times.

With support member 38 positioned in bracket 32 as shown in FIGURE 1, the lateral spacing of guard members 68 and 70 permits the cutter blade 22 to tilt 45° relative to table 12 to the full tilt position shown in dotted lines in FIGURE 1 without interfering or binding with guard members 68 or 70.

In some cutting operations, the operator may move the fence, not shown, to a position between right guard member 70 and cutter blade 22. In such an operation, independent guard member 70 with its respective guard arm 54 may be rotated up and back to the inoperative dotted line position shown in FIGURE 2. However, in such an operation, left guard member 68 will remain in the normal operative position to fully protect the left side of cutter blade 22. Further, with the guard members in this condition, the entire guard assembly may be shifted in bracket 32 to the extreme left position. Transparent shield 62 is mounted on left guard arm 52 so that in this position of the guard assembly, a push stick not shown, used to urge the work through the saw, can freely pass between the fence and transparent shield 62. Thus, the guard assembly is fully effective in a cutting operation in which a narrow strip of work passes between the fence and the cutter blade.

In certain other cutting operations which involve wide cutting tools such as a dado head or a molding cutter, table insert 16 is removed and the guard assembly is again shifted from the position of FIGURE 1 to the left to the other stop position as determined by collars 40 on support member 38. The lateral spacing of guard members 68 and 70 then permits the use of both guard members even in such "wide-tool" operations.

If the cutting operation so requires, as in cross-cutting work wider than that permitted by the rearward extent of U loop 47 or in ripping work wider than permitted by the lateral extent of U loop 47, the entire guard assembly 30 may be cleared from the top of the table by simply loosening lockbolt 46 and rotating guard support 38 through substantially 180° in a clock-wise direction as seen in FIGURE 2.

In order to extend splitter blade 82 to its operative position, both guard members 68 and 70 are moved with their respective guard arms to the inoperative dotted line position shown in FIGURE 2. Table insert plate 16 is removed and the splitter blade 82 is pulled up by means of tab 84 to extend above table 12. In this operative position of splitter blade 82, detent ball 112, in bracket 94 enters opening 92 in the splitter blade 82 and retains the splitter blade in an extended position. The table insert plate 16 is then replaced with splitter blade 82 in splitter slot 20. The guard members 68 and 70 are then moved to their operative positions and because of the lateral spacing of guard members 68 and 70, they both pass clear of extended splitter blade 82 with its tab 84 and anti-kickback fingers 88 in moving from the inoperative position to the operative table-abutting position as shown in FIGURE 2.

As explained above, as the work progresses through the table saw, splitter blade 82 spreads the work so as to prevent binding of cutter blade 22. As the work passes the splitter blade 82, independent anti-kickback fingers 88 merely drag across the top of the work as the work is being fed through the saw; however, if cutter blade 22 catches the work and tends to throw it forward, the anti-kickback fingers 88 dig into the work to prevent such forward motion.

In order that splitter blade 82 may be useful with cutter blade 22 in any bevel cutting operation, splitter bracket 94 is mounted on rear trunnion 24 of table saw 10. Trunnion 24 rotates with cutter blade 22, thus keeping splitter blade 82 in the plane of blade 22 at all times.

In summary, this invention provides an improved blade guard and splitter assembly for a table saw that is constructed in a novel manner so as to ensure complete versatility in the use of the assembly in substantially all the various cutting operations on the table saw. Further, the two part, plate-like, laterally spaced construction of the blade guard of the assembly provides sufficient clearance between the guard and the splitter to permit full guard protection of the rotary cutter blade regardless of whether the splitter blade is in its retracted or extended position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A guard assembly for a table saw having a work table formed with a cutter opening and a rotary cutter protruding upwardly through said cutter opening to engage a work piece fed across said table to said rotary cutter comprising:
    (a) a rod-like support means adapted at one end to be fixed to the work table and having its other end portion adapted when said support means is assembled to a work table to overlie a portion of the work table to the rear of the cutter opening and extend crosswise with respect to said cutter opening;
    (b) respective arm means pivotally journalled on said rod-like support means in axially spaced relation along said other end portion of said rod-like support means;
    (c) respective pairs of stop collars fixed to said other end portion of said rod-like support means in abutting relation to the opposite sides of said respective arm means to restrain said respective arm means against axial movement along said other end portion of said rod-like support means;
    (d) blade guard members in the form of elongated plates respectively pivotally suspended from said respective arm means and having lower edges formed at one end with upwardly inclined portions adapted in use to serve as cam surfaces to be engaged by a workpiece fed across said table to said rotary cutter to independently tilt said blade guard members and thereafter raise said blade guard members and their respective arm means as the workpiece moves the rotary cutter; and
    (e) a transparent shield fixed to one of said respective arm means and extending laterally therefrom toward the other arm means and adapted to intercept chips and dust from the cutting operation and to provide a clear view of the work piece and cutter blade in the work area.

2. The guard assembly of claim 1 wherein the collars of said respective pairs of collars are fixed to said other end portion of said rod-like support means by headed set screws and said respective arm means are formed with respective laterally direction abutment surfaces adapted, upon swinging said respective arm means in a direction away from said table, to contact the heads of said set screws to limit the movement of said respective arm means in said direction, and to support said respective arm means and their associated guard members in an inoperative position clear of the table and work pieces fed thereacross.

3. The guard assembly of claim 1 wherein said one end of said rod-like support means is adapted to be fixed to the work table by means of a bracket element having a through socket passage to receive said one end; bolt means for securing said bracket element to the work table; and manually releasable clamp means supported to enter said socket passage and clampingly lock said one end of said rod-like support means against axial and rotational movement with respect to said bracket element.

4. In a table saw having a table and a rotary cutter which protrudes through an opening provided in said table, a cutter guard and splitter assembly comprising:
    (a) cutter guard support means connected to an extending along and above the rear edge of said table;
    (b) separate arms independently pivotally connected to said cutter guard support means and normally extending forwardly therefrom;
    (c) blade guard members in the form of plates respectively freely pivotally connected to said arms and normally disposed along opposite sides of said rotary cutter, said members with their respective arms being adapted for independent movement from said normal position to an inoperative position above and to the rear of said table;
    (d) splitter support means connected to said table saw below the rear end of said table opening;
    (e) and splitter means slidably supported by said splitter support means for sliding movement through said table opening from a retracted position below said table to an operative position thereabove;
    (f) said blade guard members being so positioned laterally that they clear said splitter means in its operative position when said blade guard members and their respective arms are moved to and from said inoperative position.

5. A splitter assembly for a table saw having a rotary cutter protruding through an opening provided in the saw table comprising:
    (a) splitter support means adapted to be connected to the table saw below the rear end of the table opening;
    (b) and a splitter blade slidably engaged by said support means for translatory movement and adapted to be moved through the table opening between a retracted position below the table and an operative position thereabove;
    (c) said support means including a clamping member forming a groove engaging one edge of said splitter blade and a rigid clamping member forming a second groove engaging the other edge of said splitter blade whereby said blade is frictionally held between said clamping members.

6. The splitter assembly of claim 5, together with an integral blade-positioning tab extending perpendicularly to said blade and anti-kickback means pivotally connected to the upper end of said splitter blade below said tab.

7. In a table saw having a table and a rotary cutter which protrudes through a slot in an insert in an opening provided in said table, a splitter assembly comprising:
    (a) splitter support means connected to said table saw below the rear end of said table opening;
    (b) and a splitter blade supported by said support means for sliding movement through said table opening between a retracted position completely below said table and an operative position thereabove;
    (c) said table opening insert having a second slot opened at the rear edge of said insert to accommodate said splitter blade.

8. A splitter assembly for a table saw having a rotary cutter protruding through an opening provided in the saw table comprising:
(a) splitter support means adapted to be connected to the table saw below the rear end of the table opening; and
(b) splitter means slidably engaged by said support means for translatory movement and adapted to be moved through the table opening between a retracted position below the table and an operative position thereabove;
(c) said splitter support means including a spring biased detent means and said splitter means including an opening engaged by said detent means when said splitter means is in its operative position.

9. In a table saw having a table and a rotary cutter which protrudes through an opening provided in said table, a splitter assembly comprising:
(a) splitter means disposed rearwardly of said rotary cutter;
(b) support means mounted below said table at the rear end of said table opening and supporting said splitter means for sliding movement relative to said saw and through said table opening between an inoperative retracted position completely below the top surface of said table and an operative protruding position thereabove; and
(c) means for securing said splitter means in place in said inoperative and operative positions;
(d) said table saw being of the tilting arbor type and including trunnion means for tilting said rotary cutter, said support means being supported by said trunnion means, whereby said splitter means tilts with said trunnion means and rotary cutter to remain in position directly rearwardly thereof at all degrees of tilt.

References Cited by the Examiner
UNITED STATES PATENTS

| | | | |
|---|---|---|---|
| 394,594 | 12/1888 | Murray | 143—159 |
| 1,888,679 | 11/1932 | Knapp | 143—159 |
| 1,993,219 | 3/1935 | Merrigan | 143—159 |
| 2,007,887 | 7/1935 | Tautz | 143—159 |
| 2,163,320 | 6/1939 | Hammond | 143—159 |
| 2,168,282 | 8/1939 | Tautz | 143—36 |
| 2,313,686 | 3/1943 | Uremovich | 143—159 |
| 2,466,325 | 4/1949 | Ocenasek | 143—159 |
| 2,530,867 | 11/1950 | Galanga | 143—159 |
| 2,742,063 | 4/1956 | Bretthauer | 143—159 |

FOREIGN PATENTS

| | | |
|---|---|---|
| 965,468 | 2/1956 | France. |
| 1,063,376 | 9/1953 | France. |
| 4,290 | 3/1886 | Great Britain. |

ROBERT C. RIORDON, *Primary Examiner.*

EARL EMSHWILLER, WILLIAM W. DYER, LESTER M. SWINGLE, *Examiners.*